United States Patent [19]
Audry et al.

[11] Patent Number: 4,883,859
[45] Date of Patent: Nov. 28, 1989

[54] PROCESS FOR PRODUCING HYDROXYLATED POLYBUTADIENE

[75] Inventors: Richard Audry, Beaumont-le-Roger; Gerard Krempf, Sainte-Foy-les-Lyon; Jackie Perono, Lyons, all of France

[73] Assignee: ATOCHEM, Paris La Defense, France

[21] Appl. No.: 205,086

[22] Filed: Jun. 10, 1988

[30] Foreign Application Priority Data

Jun. 15, 1987 [FR] France ................................ 87 08571

[51] Int. Cl.$^4$ ................................................. C08F 6/08
[52] U.S. Cl. .................................. 528/484; 525/333.2; 525/384; 526/67; 526/70; 528/489
[58] Field of Search ................................ 528/484, 487; 525/333.2; 526/67, 70

[56] References Cited

U.S. PATENT DOCUMENTS

| | | | |
|---|---|---|---|
| 3,129,205 | 4/1964 | Rowe et al. | 528/484 |
| 3,468,844 | 9/1969 | Rothert | 528/484 |
| 4,043,874 | 8/1977 | Testa et al. | 528/484 |
| 4,518,770 | 5/1985 | Kaplan et al. | 528/487 |

Primary Examiner—Joseph L. Schofer
Assistant Examiner—Bernard Lipman
Attorney, Agent, or Firm—Sigalos, Levine & Montgomery

[57] ABSTRACT

In the process of producing hydroxylated polybutadiene from a diene monomer in the presence of hydrogen peroxide and a solvent, wherein the solvent is recovered by distillation for reuse; after separation of the hydroxylated polybutadiene from mixture containing such solvent and reaction impurities, the improvement comprising subjecting said mixture to the action of an alkali metal hydroxide or a hydrazine prior to distillation.

11 Claims, No Drawings

PROCESS FOR PRODUCING HYDROXYLATED POLYBUTADIENE

BACKGROUND OF THE INVENTION

The present invention pertains to a process for producing hydroxylated polybutadiene; butadiene homopolymer containing hydroxyl groups, from a diene monomer in the presence of hydrogen peroxide and a solvent.

More particularly, it pertains to the recovery of the solvent in such a process.

It is known that hydroxylated polybutadiene can be prepared, e.g., according to the methods described in U.S. Pat. Nos. 3,673,168, 3,796,762 or 4,518,770. The nature and the properties of the dienes and the solvents suitable for use are reviewed in the latter patent cited. 1,3-butadiene is most frequently used as the 1,3-diene. 2-propanol or isopropanol is frequently selected as the solvent.

After the hydroxylated polybutadiene, which is the product, has been separated from the solvent, the solvent is recovered for recycling from a mixture called the "solvent mixture" below. Besides the solvent, this mixture also contains water, which may be present as the majority component, e.g., due to the fact it is introduced as wash water or as a condensate, hydrogen peroxide and other compounds which will be called "impurities" below, e.g., essentially vinyl cyclohexene, small quantities of diene monomer, sometimes notable quantities of polybutadienes and perhaps acetone.

The solvent mixture consequently has a composition (on a weight basis) varying between fairly broad limits; for example, a solvent such as isopropanol: 5% to 80%; water: 10% to 90%; hydrogen peroxide: 0.2% to 4%, most often 1% to 3%; impurities: less than 10%, generally consisting of vinyl cyclohexene: 0.2% to 5%, polymers, the majority of which are low-molecular-weight polybutadienes: 0.01% to 5% and butadiene: less than 0.1%. It may also contain 0.05% to 0.2% acetone, e.g., if the solvent is isopropanol.

The solvent is recovered during the part of the process which is reserved for this purpose and is called "recovery" below.

The recovery is commonly carried out by distillation of the solvent mixture. The description and the schematic diagram of such a process, carried out in two distillation columns, are given, e.g., in U.S. Pat. No. 4,518,770.

Unfortunately, if the solvent mixture is directly subjected to distillation, the distillation is greatly perturbed by the rapid fouling of the columns, particularly below the feed levels. The components of the distillation system, e.g., the trays and the overflows, are consequently obstructed by solid matter attributed to the presence in the solvent mixture of hydrogen peroxide and certain impurities, such as polymers or still polymerizable compounds.

To alleviate this major disadvantage, whose deleterious consequences affect the solvent recovery yield and the quality of the solvent, U.S. Pat. No. 4,518,770 proposes that the solvent mixture should only be distilled after an alkali metal sulfite or bisulfite is added.

Such a method has at least two disadvantages; one that waste is formed which is in the form of salts and the other that the impurities present in the solvent mixture; the salt added and their reaction products, are allowed to enter the distillation process.

SUMMARY OF THE INVENTION

The present invention makes it possible to avoid these disadvantages and it also ensures the operation of the distillation columns for very long periods of time without disturbances caused by fouling, as well as a high solvent recovery yield.

In its general form, it is characterized in that prior to distillation, the solvent mixture as defined above is subjected to the action of an alkali metal hydroxide or to the action of hydrazine.

DETAILED DESCRIPTION

The hydroxide generally selected in practice is sodium hydroxide; although, other alkali metal hydroxides can be used and the hydrazine used is preferably in the form of hydrazine hydrate.

The hydroxide or the hydrazine acts according to the present invention at a temperature between 20° C. and 150° C., the temperature often selected being that which corresponds to the boiling point under atmospheric pressure of the medium in which either of the agents acts.

For example, this boiling point is on the order of magnitude of 80° C. in the case of the solvent mixtures most frequently encountered if isopropanol is the solvent.

The quantity of hydroxide used, expressed in weight percent of sodium hydroxide in the medium, is between ca. 0.1% and 1%. Most often it is between 0.3% and 0.6% if the initial hydrogen peroxide concentration is in the most common range.

The quantity of hydrazine hydrate used must, in general, be such that the molar ratio of hydrazine to hydrogen peroxide be higher than 0.5, preferably between ca. 0.75 and 1.

The duration of the action of the hydroxide or hydrazine depends on other parameters, but it is, in general, between five minutes and five hours, most often between 15 minutes and four hours.

The hydroxide or hydrazine exerts its action on the solvent mixture by being admixed therewith, for example, in a reactor essentially equipped with an agitating means, a controllable heating means, and a reflux condenser combined with a system permitting the nitrogen formed during the action of the hydrazine or the oxygen formed during the action of the hydroxide to be evacuated from the reactor. In the latter case in particular it is necessary to prevent the risk of the formation of an explosive gaseous mixture, e.g., by admitting nitrogen or controlling the rate of boiling, depending on the particular case. The absolute pressure in the reactor is most often between 1 and 5 bars (absolute).

If the product obtained by the action of the hydroxide or hydrazine is allowed to stand, an oily phase will separate in most cases, and this phase is preferably removed It can be removed, e.g, by pumping, simple flow or overflow, e.g., in a phase separator or decanter. The oily phase thus removed, which generally accounts for less than 5 wt. %, may be destroyed, e.g., by incineration.

The remaining product may then directly enter the distillation process or preferably it may be subjected to evaporation by boiling to form a gas stream which will form the product that will be subjected to the distillation process. It was indeed observed that the action of the hydroxide or hydrazine renders the undesirable impurities practically separable due to the said evaporation, which may be carried out in a known device, e.g., of the type of an easy-to-clean boiler, with or without recirculation, e.g., a scraping film evaporator, essentially equipped with a heating means, e.g., a double jacket, a demister for the vapors produced and a system for the continuous or intermittent removal of the nonevaporated products. These account, in general, for ca. 2 wt. % to 6 wt. % of the product subjected to evaporation. They may be destroyed by incineration. Evaporation by boiling is carried out in practice under a pressure equaling or exceeding the operating pressure of the first column. It is generally between 1 and 5 bars (absolute) and it often equals or is close to 1 bar (absolute). To complete the solvent recovery at this stage, a fraction of the nonevaporated products extracted from the evaporator can be returned to the stage in which the organic phase is separated, which takes place after the action of the hydroxide or the hydrazine.

It is possible to work with two evaporators installed in parallel, one operating while the other is being cleaned.

Carrying out the present invention in a recovery section designed according to a process scheme which is comparable to that described in U.S. Pat. No. 4,518,770 makes it possible to combine the conditions which permit the distillation to be carried out without disturbances due to fouling over a period equaling at least that specified in the above-referenced patent, using as the common reference the results which can be observed without the addition of a chemical agent to the solvent mixture. This possibility might be linked with the fact that at the end of the action of the hydroxide or the hydrazine, the quantity of hydrogen peroxide practically becomes zero or in most cases it does not exceed 0.2 wt. %, which is favorable from the viewpoint of safety.

If it comprises evaporation prior to distillation, the process according to the present invention ensures the operation of the columns for very long periods of time by preventing the products which are potential sources of fouling from causing fouling.

The treatment of the effluents is facilitated The hydroxide present in the effluents may even contribute, e.g., to the neutralization of an acidic effluent of a different origin. The hydrazine here only occurs in water.

The present invention offers the additional advantage of being suitable for the recovery of the solvent from solvent mixtures in which polymers are present in large amounts.

The present invention may be carried out as a continuous or intermittent process.

The present invention will be further described by the following examples, which are given for purposes of illustration only.

EXAMPLE 1

The production of hydroxylated polybutadiene from 2,3-butadiene, hydrogen peroxide, and isopropanol as the solvent led to the formation of a solvent mixture having the following composition, on a weight basis: 70% isopropanol, 17.5% water, 2.6% hydrogen peroxide, 0.15% acetone, 4.5% vinyl cyclohexenes, 5.22% polybutadiene-type polymers and 0.05% other impurities, including butadiene. 0.42 g of sodium hydroxide was added in the form of a 30 wt. % aqueous solution of hydroxide per 100 g of the above-described mixture, and this hydroxide exerted its action within 30 minutes at the boiling point under atmospheric pressure in a reactor equipped with a reflux condenser.

At the end of this period of time, the hydrogen peroxide concentration, which is already below 0.02 wt. % after 15 minutes, is only 0.01 wt. %. After cooling to 45° C. and removal of the oily phase that separated from the rest of the mixture on standing, the residual mixture is distilled off according to a distillation process described in U.S. Pat. No. 4,518,770, evidently without injecting an alkali metal sulfite or bisulfite. p The two columns used are glass columns with an outside diameter of 50 mm equipped with bubble caps.

The distillation is conducted continuously, as that carried out for comparison in the case of the solvent mixture as such.

In the experiment, in which sodium hydroxide is used, fouling of the columns, which is visible but very slight, has no effect on the distillation conditions during the operation at the end of which it causes cessation of the distillation in the comparison experiment.

EXAMPLE 2

The production of hydroxylated polybutadiene from 1,3-butadiene, hydrogen peroxide, and isopropanol as the solvent led to the formation of a solvent mixture having the following composition, on a weight basis: 24.3% isopropanol, 71.3% water, 1% hydrogen peroxide, 0.04% acetone, 1.55% vinyl cyclohexenes, 1.8% polymers and 0.01% other impurities, including butadiene.

This mixture is subjected to the action of sodium hydroxide as in Example 1, with the exception that the amount of the hydroxide is 0.3 g per 100 g of mixture and the duration at the boiling point is only 15 minutes, and the hydrogen peroxide concentration is lower than 0.01 wt. % at the end of this period.

The subsequent process is the same as in Example 1.

The conclusions made in Example 1 relative to a comparison experiment remain valid.

EXAMPLE 3

The production of hydroxylated polybutadiene from 1,3-butadiene, hydrogen peroxide, and isopropanol as the solvent led to the formation of a solvent mixture having the following composition, on a weight basis: 42.8% isopropanol, 49.6% water, 1.6% hydrogen peroxide, 0.1% acetone, 2.7% vinyl cyclohexene, 3.2% polymers, especially of the polybutadiene type and trace amounts of other impurities, including butadiene.

The solvent mixture is charged at a rate of 2.5 liters/hour into an agitated reactor equipped with a reflux cooling system and a system for continuously drawing off liquid on the side, so that ten liters of liquid will remain in the reaction during the entire experiment, and an aqueous sodium hydroxide solution containing 30% sodium hydroxide is charged in at a rate of 32.3 $cm^3/h$. The liquid present in the reactor at the beginning of the feed of the solvent mixture and of the hydroxide is the result of the treatment without flow of a batch of solvent mixture and hydroxide in the above-mentioned proportions for 30 minutes at the boiling point. Consequently, it contains practically no hydrogen peroxide. The continuous operation was continued, always at the boiling point and while agitating for about 50 hours, during which period the product being continuously discharged from the reactor is found to contain at most 0.01% hydrogen peroxide.

After continuous removal of the oily phase formed on settling of the mixture from the reactor by overflow in a separator operating at 50° C. with a residence time of two hours, the residual product is continuously charged into an evaporator from which a gas stream is discharged at a temperature of 95° C.-96° C., and the mist droplets are removed from this stream before distillation. The products not evaporated by boiling are removed as an effluent from the mixture entering the evaporator at a mean rate of 5.0 wt. %.

In distillation carried out as a continuous process in the conventional manner in two glass columns, the fouling remains negligible after an operating time equaling the period after which disturbances occur if the liquid resulting from the action of the hydroxide or hydrazine is introduced directly during distillation after removal of the oily phase.

EXAMPLE 4

Example 1 is repeated with the difference that 2.9 g of hydrazine hydrate ($NH_2$—$NH_2.H_2O$) are used instead of sodium hydroxide, and the duration is 1.5 hours. The same conclusions are drawn as in Example 1 concerning the improvement of the distillation process.

EXAMPLE 5

Example 2 is repeated with the difference that 1.5 g of hydrazine hydrate are used instead of sodium hydroxide. The amount of hydrogen peroxide practically drops to zero after 30 minutes of action, and the conclusions drawn in Example 2 concerning the distillation process remain valid here.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. In the process of producing hydroxylated polybutadiene from a diene monomer in the presence of hydrogen peroxide and a solvent, wherein the solvent is recovered by distillation for reuse; after separation of the hydroxylated polybutadiene from a mixture containing such solvent and reaction impurities, the improvement comprising subjecting said mixture to the action of an alkali metal hydroxide or a hydrazine prior to distillation.

2. The process of claim 1, wherein the hydroxide is sodium hydroxide.

3. The process of claim 2, wherein the hydroxide is used at a rate of 0.1 wt. % to 1 wt. % of the mixture in which it is to act.

4. The process of claim 3, wherein the hydroxide is used in an amount of 0.3 wt. % to 0.6 wt. % relative to the mixture in which it is to act.

5. The process of claim 1, wherein the hydrazine is used in an amount such that the molar ratio of hydrazine to hydrogen peroxide is higher than 0.5.

6. The process of claim 5, wherein the molar ratio of hydrazine to hydrogen peroxide is between 0.75 and 1.

7. The process of any one of claims 1 to 6, wherein the temperatures at which said hydroxide or hydrazine acts on said mixture is between 20° C. and 150° C.

8. The process of any one of claims 1 to 6, wherein the hydroxide or hydrazine acts at a temperature equaling the boiling point of the mixture under atmospheric pressure.

9. The process of any one of claims 1 to 6, wherein the mixture, after being subjected to the action of the hydroxide or the hydrazine, is evaporated by boiling to form a gas stream which enters the distillation.

10. The process of any one of claims 1 to 6, wherein the mixture, after being subjected to the action of the hydroxide or hydrazine, is evaporated by boiling carried out under an absolute pressure between 1 and 5 bars and then distilled.

11. The process of any of claims 1 through 6, wherein at the end of the action of the hydroxide or the hydrazine the mixture is allowed to stand until an oily phase forms, separating the oily phase from the mixture, and then distilling the mixture.

* * * * *

UNITED STATES PATENT AND TRADEMARK OFFICE
CERTIFICATE OF CORRECTION

PATENT NO.   : 4,883,859
DATED        : November 28, 1989
INVENTOR(S)  : Audry et al.

It is certified that error appears in the above-identified patent and that said Letters Patent is hereby corrected as shown below:

In the Abstract of the Invention, line 5 after the word "from" insert --a--.

Column 1, line 25, after the word "below" should begin a new paragraph.

Column 2, line 59, after the word "moved" insert --.--.

Column 3, line 11, the word "Evaporation" should begin a new paragraph;

line 16, the word "To" should should begin a new paragraph;

line 44, after the word "facilitated" insert --.--;

UNITED STATES PATENT AND TRADEMARK OFFICE
CERTIFICATE OF CORRECTION

PATENT NO. : 4,883,859

DATED : November 28, 1989

INVENTOR(S) : Audry et al

It is certified that error appears in the above-identified patent and that said Letters Patent is hereby corrected as shown below:

line 66, the word "0.42" should begin a new paragraph;

Column 4, line 11, after the word "bisulfate." delete the "p";

line 11, the word "The" should begin a new paragraph.

Signed and Sealed this

Eighteenth Day of December, 1990

Attest:

HARRY F. MANBECK, JR.

*Attesting Officer*  *Commissioner of Patents and Trademarks*